Dec. 3, 1935.  J. E. HIGGINS  2,023,050
CULTIVATOR ATTACHMENT
Filed July 11, 1935   2 Sheets-Sheet 1
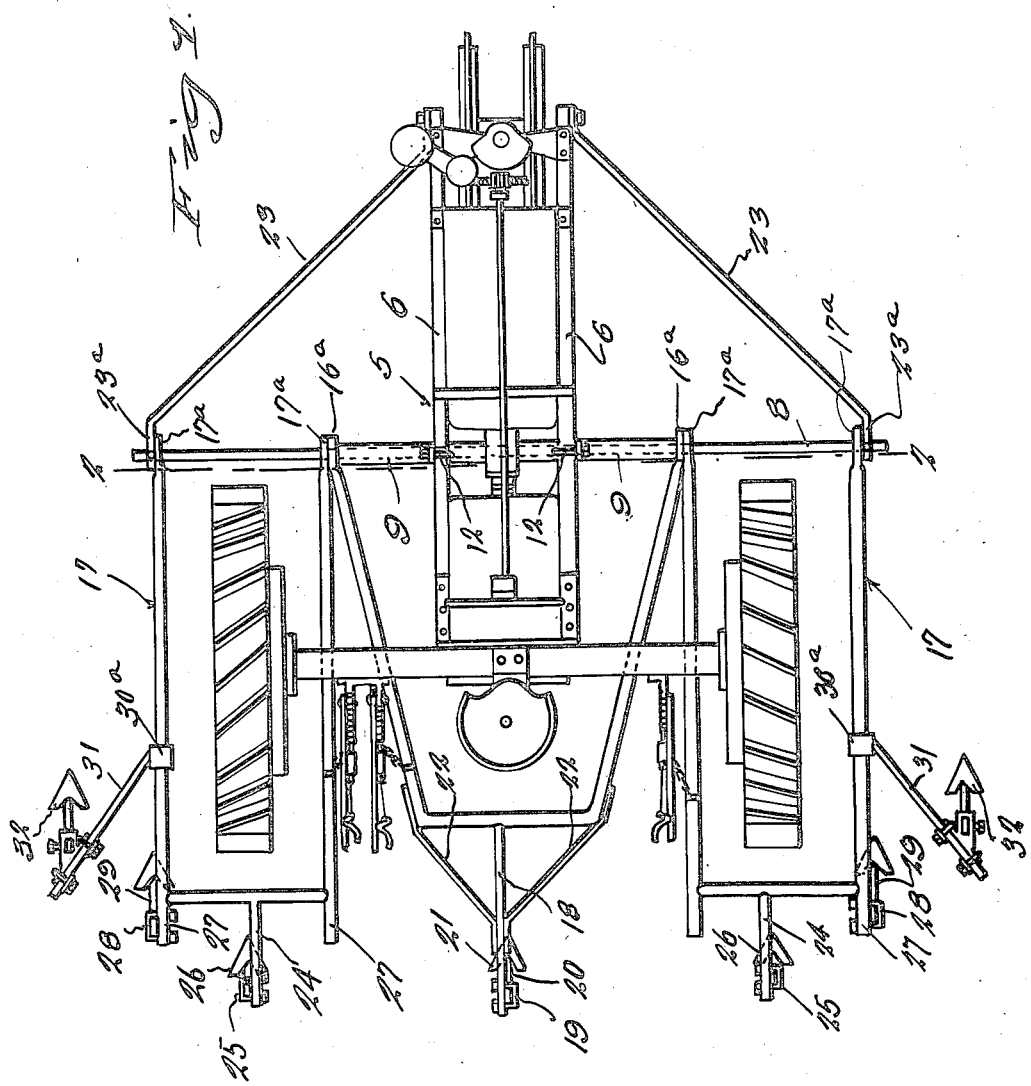
Inventor
Jesse E. Higgins
By Clarence A. O'Brien
Attorney

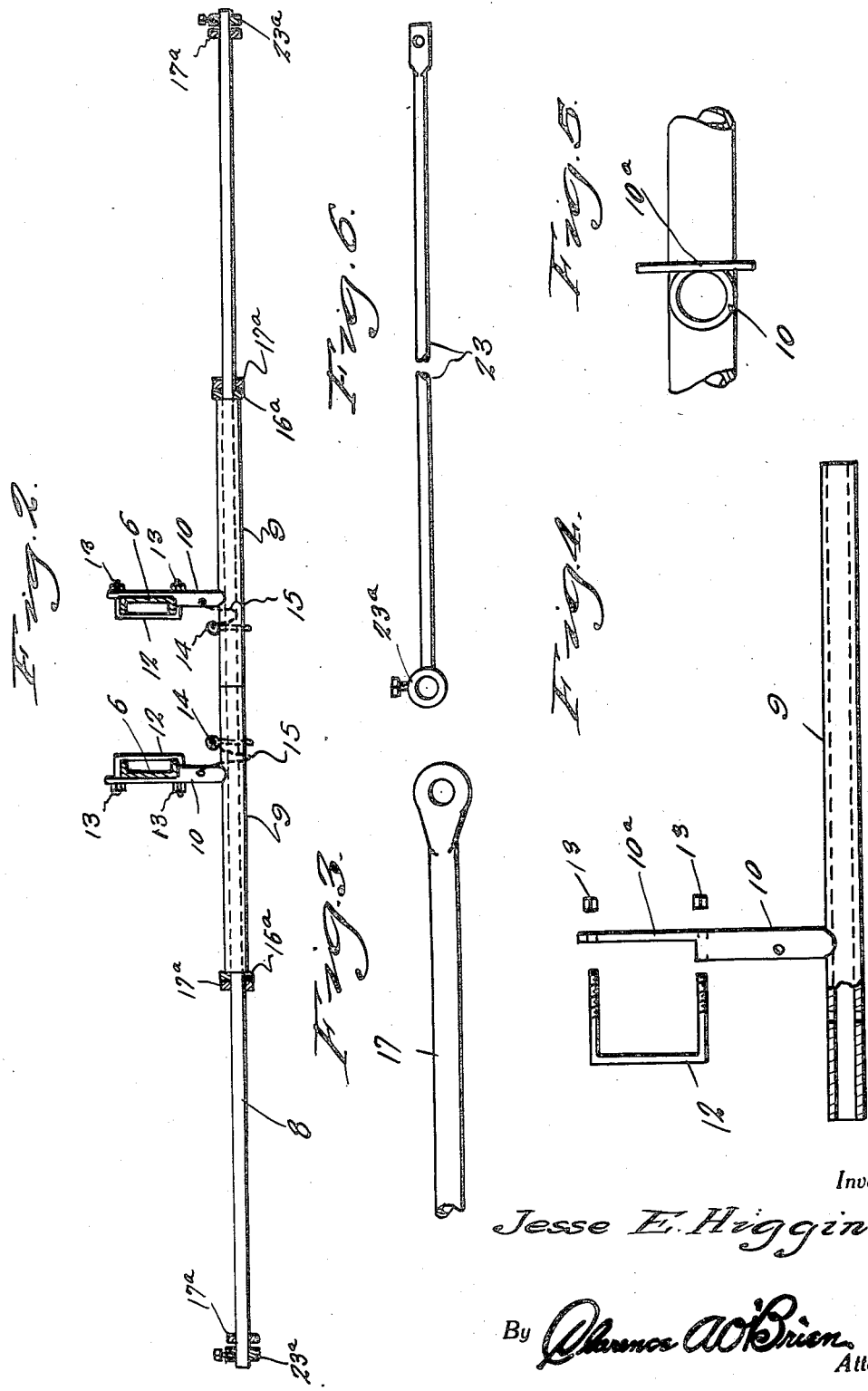

Patented Dec. 3, 1935

2,023,050

UNITED STATES PATENT OFFICE 2,023,050

CULTIVATOR ATTACHMENT

Jesse E. Higgins, Merkel, Tex.

Application July 11, 1935, Serial No. 30,892

2 Claims. (Cl. 97—47)

This invention relates broadly to cultivator attachments and the object of the invention is to provide an attachment of this character especially adapted to be mounted on a "Farmall" tractor for cultivating.

At the present time farmers are generally inclined to plant their crops on what is called a two rows and skip one basis. It is therefore the primary object of this invention to provide for the cultivating of the odd row in the same manner and at the same time as the two rows which are planted.

A further object of the invention is to provide an attachment of this character which can be readily and easily applied to a tractor, and which is characterized by simplicity of construction and ease of application to the tractor.

The invention together with its objects and advantages will be best understood from a study of the following description taken in connection with the accompanying drawings wherein:

Figure 1 is a top plan view illustrating the application of the attachment.

Figure 2 is a sectional view taken substantially on the line 2—2 of Figure 1.

Figure 3 is a fragmentary side elevational view of one of the side members of a tool supporting frame.

Figure 4 is a side elevational view of a sleeve and clamping bolt, the view showing the parts separated.

Figure 5 is a top plan view of the sleeve structure shown in Figure 4.

Figure 6 is a side elevational view of a brace rod.

Referring to the drawings by reference numerals it will be seen that 5 indicates generally a "Farmall" tractor, the side frames of which are indicated by the reference numerals 6.

My improved attachment indicated generally by the reference numeral 7 comprises a cross rod 8 that extends through a pair of aligned elongated sleeves 9 arranged in end to end abutting relation as shown in Figure 2.

Each of the sleeves 9 adjacent one end has a short post 10 rising therefrom. At its upper end, the post 10 is notched as at 10a to accommodate a side frame member 6 of the tractor as clearly shown in Figure 2. Cooperating with the notched end 10a, of each post 10, is a U-shaped clamping bolt 12 that straddles the frame member 6 and which, through the medium of nuts 13 serves to positively secure the sleeves 9 in position on the tractor.

For securing the rod 8 at the desired longitudinal adjustment relative to the sleeve 9, said rod 8 and sleeves 9 are provided with apertures or openings receiving pins 14. These pins 14 are secured against loss through the medium of flexible elements 15 secured to the pins and to the post 10.

The attachment also includes an intermediate tool frame 16 and end tool frames 17.

The frame 16 is substantially U-shaped having diverging sides terminating in apertured ends 16a through which the rod 8 extends. The ends 16a are in abutting engagement with the outer ends of the sleeves 9 as clearly shown.

Extending from the closed end of the frame 16 is a beam 18 to the free end of which is clamped as at 19 a tool shank 20 equipped with a plow blade 21. The beam 18 is braced with respect to the frame 16 through the medium of braces 22.

Each of the side frames 17 is also of substantially U-shaped structure and the sides of each frame 17 at the open end of the U terminate in apertured ends 17a for receiving the rod 8. Said ends of the frames 17 are confined on the rod between the ends 16a of the frame 16 and the collar equipped ends 23a of brace rods 23 that brace the cross bar 8 relative to the frame of the tractor. At one end the brace rods 23 are secured to the forward ends of the sides 6 of the tractor frame as clearly shown in Figure 1.

At the closed end thereof, each frame 17 is provided with an integral beam 24 to which is clamped as at 25 a tool shank equipped with a cultivator blade as shown and indicated generally at 26.

Each of the frame members 17 at the closed end thereof have the sides thereof also extended to form beams 27 and in the present instance, there is clamped to the outermost beam 27 of each frame 17 as at 28 a shank for a tool as indicated generally at 29.

On the outer side member of each frame 17 there is also secured the collar equipped end 30a of an angular shaped beam 31. On the beam 31 there is mounted the tool 32, which is adapted to be adjusted along the entire length of this to accommodate various widths of rows.

In actual practice, the frames 16 and 17 will have suitable operable connection with a conventional lever and detent structure with which the tractor is usually equipped, whereby these frames 16 and 17 may be independently raised or lowered for controlling the digging depth of the tools associated therewith.

It will be apparent that changes in the details of construction, and in the combination and arrangement of parts may be resorted to without departing from the spirit or scope of the invention as hereinafter claimed or sacrificing any of its advantages.

Having thus described the invention, what is claimed as new is:

1. In combination with a tractor having side frame members, a pair of aligned sleeve members each provided with a post, means for securing the post of each sleeve to a side frame member of the tractor, a cross bar extending through the aligned sleeves, a plurality of substantially U-shaped frames, each frame having the sides thereof at the open end of the U provided with apertures through which said cross bar extends, each frame being also provided with one or more beams, and a tool clamped to each beam.

2. In combination with a tractor having side frame members, a pair of aligned sleeve members each provided with a post, means for securing the post of each sleeve to a side frame member of the tractor, a cross bar extending through the aligned sleeves, and earth working means mounted on the end portions of the cross bar.

JESSE E. HIGGINS.